US009253737B2

(12) United States Patent
Brown et al.

(10) Patent No.: US 9,253,737 B2
(45) Date of Patent: Feb. 2, 2016

(54) DECREASING BATTERY POWER CONSUMPTION IN MOBILE COMMUNICATION DEVICES

(71) Applicant: International Business Machines Corporation, Armonk, NY (US)

(72) Inventors: Jay A. Brown, Long Beach, CA (US); Thomas J. Watson, Riverside, CA (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/276,064

(22) Filed: May 13, 2014

(65) Prior Publication Data

US 2015/0334665 A1 Nov. 19, 2015

(51) Int. Cl.
*H04W 52/28* (2009.01)
*H04W 72/04* (2009.01)

(52) U.S. Cl.
CPC .......... *H04W 52/288* (2013.01); *H04W 52/283* (2013.01); *H04W 52/285* (2013.01); *H04W 72/0473* (2013.01); *Y02B 60/50* (2013.01)

(58) Field of Classification Search
None
See application file for complete search history.

(56) References Cited

U.S. PATENT DOCUMENTS

| 7,079,873 | B2 | 7/2006 | Fan et al. |
|---|---|---|---|
| 7,660,578 | B2 | 2/2010 | Viitamaki et al. |
| 7,848,784 | B2 | 12/2010 | Roh et al. |
| 7,904,023 | B2 | 3/2011 | Viitamaki et al. |
| 7,912,517 | B2 | 3/2011 | Park |
| 8,050,724 | B2 | 11/2011 | Park |
| 8,213,979 | B1 * | 7/2012 | Shetty .................. H04W 52/12 370/252 |
| 8,265,713 | B2 | 9/2012 | Tashiro |
| 8,346,234 | B2 | 1/2013 | Banga et al. |
| 8,638,704 | B2 | 1/2014 | Gupta et al. |
| 8,649,821 | B2 | 2/2014 | Moran et al. |
| 2010/0238895 | A1 * | 9/2010 | Nakatsugawa ........ H04W 16/14 370/329 |
| 2010/0248771 | A1 * | 9/2010 | Brewer ................. H04W 72/10 455/518 |
| 2011/0098076 | A1 * | 4/2011 | Kim ..................... H04W 52/12 455/522 |
| 2012/0307702 | A1 * | 12/2012 | Nakae .................... H04W 48/12 370/311 |
| 2013/0229964 | A1 * | 9/2013 | Chakravarthy ... H04W 52/0212 370/311 |

FOREIGN PATENT DOCUMENTS

CN 102946630 A 2/2013

OTHER PUBLICATIONS

"Cellular network," Wikipedia, dated Mar. 28, 2014, 9 pages. Accessed Apr. 16, 2014, http://en.wikipedia.org/wiki/Cellular_network.

(Continued)

*Primary Examiner* — Yemane Mesfin
*Assistant Examiner* — Peter Chen
(74) *Attorney, Agent, or Firm* — Yee & Associates, P.C.; John Timar

(57) ABSTRACT

Decreasing battery power consumption in a mobile communication device by reducing transmission power is provided. In response to a cellular communication tower detecting a state of the mobile communication device communicating wirelessly, the cellular communication tower directs the mobile communication device to reduce the transmission power of the mobile communication device to decrease the battery power consumption in the mobile communication device. The state of the mobile communication device receives information at a first rate and sends information at a second rate below a threshold.

11 Claims, 5 Drawing Sheets

(56) References Cited

OTHER PUBLICATIONS

"Channel access method," Wikipedia, dated Oct. 4, 2013, 6 pages. Accessed Apr. 16, 2014, http://en.wikipedia.org/wiki/Channel_access_method.

"Enhanced Data Rates for GSM Evolution," Wikipedia, dated Mar. 10, 2014, 4 pages. Accessed Apr. 16, 2014, http://en.wikipedia.org/wiki/Enhanced_Data_Rates_for_GSM_Evolution.

"GSM," Wikipedia, dated Apr. 5, 2014, 10 pages. Accessed Apr. 16, 2014, http://en.wikipedia.org/wiki/GSM.

"High Speed Packet Access," Wikipedia, dated Apr. 16, 2014, 4 pages. Accessed Apr. 16, 2014, http://en.wikipedia.org/wiki/High-Speed_Packet_Access.

"LTE Advanced," Wikipedia, dated Apr. 15, 2014, 7 pages. Accessed Apr. 16, 2014, http://en.wikipedia.org/wiki/LTE_Advanced.

* cited by examiner

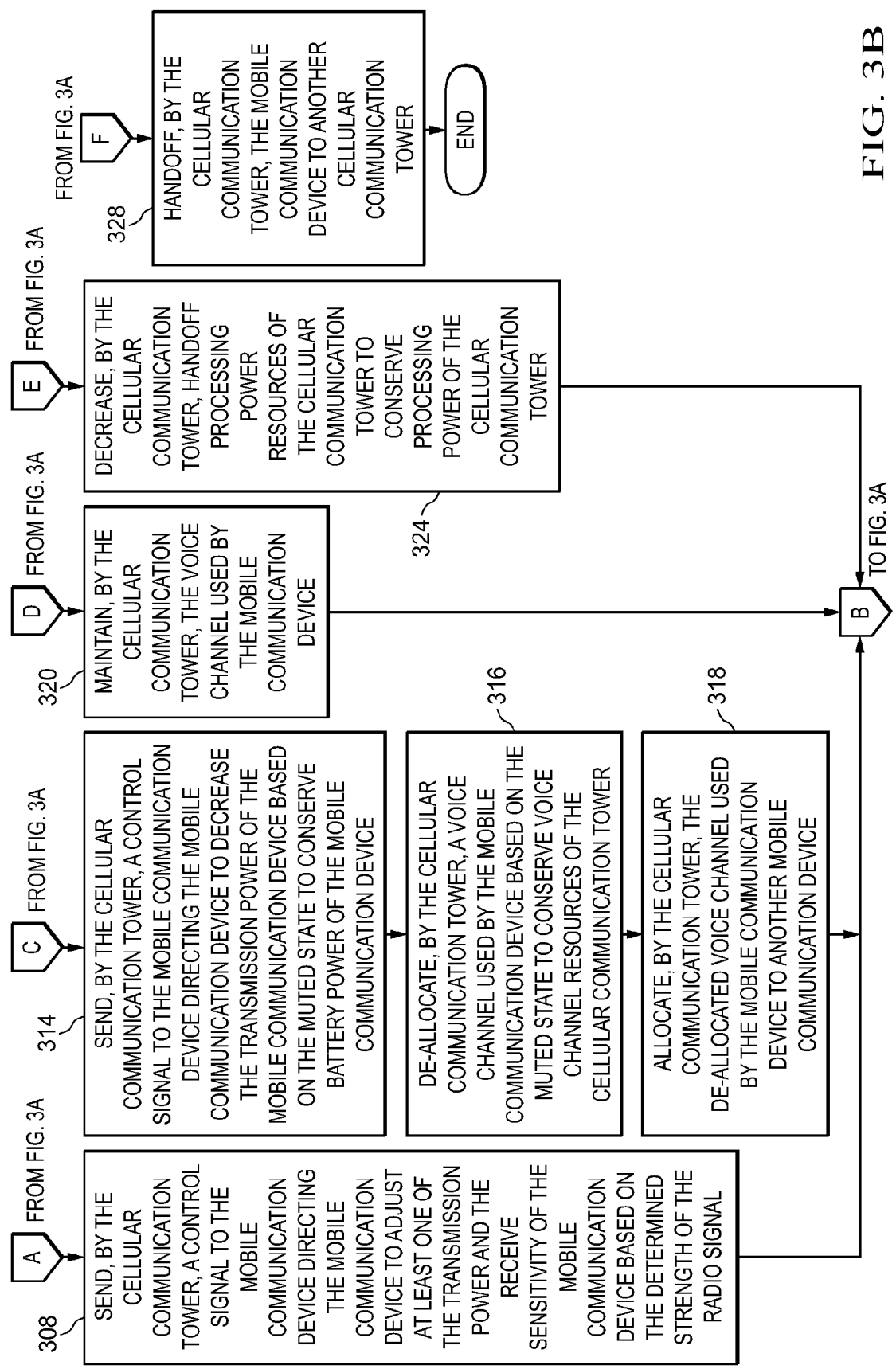

DECREASING BATTERY POWER CONSUMPTION IN MOBILE COMMUNICATION DEVICES

BACKGROUND

1. Field

The disclosure relates generally to cellular networks and more specifically to decreasing consumption of battery power in a mobile communication device by radio transmission power reduction in response to user action on the mobile communication device.

2. Description of the Related Art

A cellular network is a wireless network distributed over land areas called cells. Each cell in the cellular network is served by at least one fixed-location cellular radio communication tower or base station. Within the cellular network, each cell uses a different set of radio frequencies from neighboring cells to avoid interference and provide guaranteed bandwidth within each cell.

When joined together these cells provide radio communication coverage over a wide geographic area. This enables mobile communication devices, such as, for example, smart phones, cellular telephones, hand held computers, and personal digital assistants, to communicate with each other and with fixed-location telephones and computers anywhere within the network, via the cellular radio communication towers. This radio communication is possible even when mobile communication devices are moving from one cell to another during transmission.

SUMMARY

According to one illustrative embodiment, a method for decreasing battery power consumption in a mobile communication device by reducing transmission power is provided. In response to a cellular communication tower detecting a state of the mobile communication device communicating wirelessly, the cellular communication tower directs the mobile communication device to reduce the transmission power of the mobile communication device to decrease the battery power consumption in the mobile communication device. The state of the mobile communication device receives information at a first rate and sends information at a second rate below a threshold. According to other illustrative embodiments, a cellular communication tower and a computer program product for decreasing battery power consumption in a mobile communication device by reducing transmission power are provided.

BRIEF DESCRIPTION OF THE SEVERAL VIEWS OF THE DRAWINGS

FIGS. 3A-3B are a flowchart illustrating a process for managing cellular network resources within a cell associated with a cellular communication tower in accordance with an illustrative embodiment.

DETAILED DESCRIPTION

Figure 1:
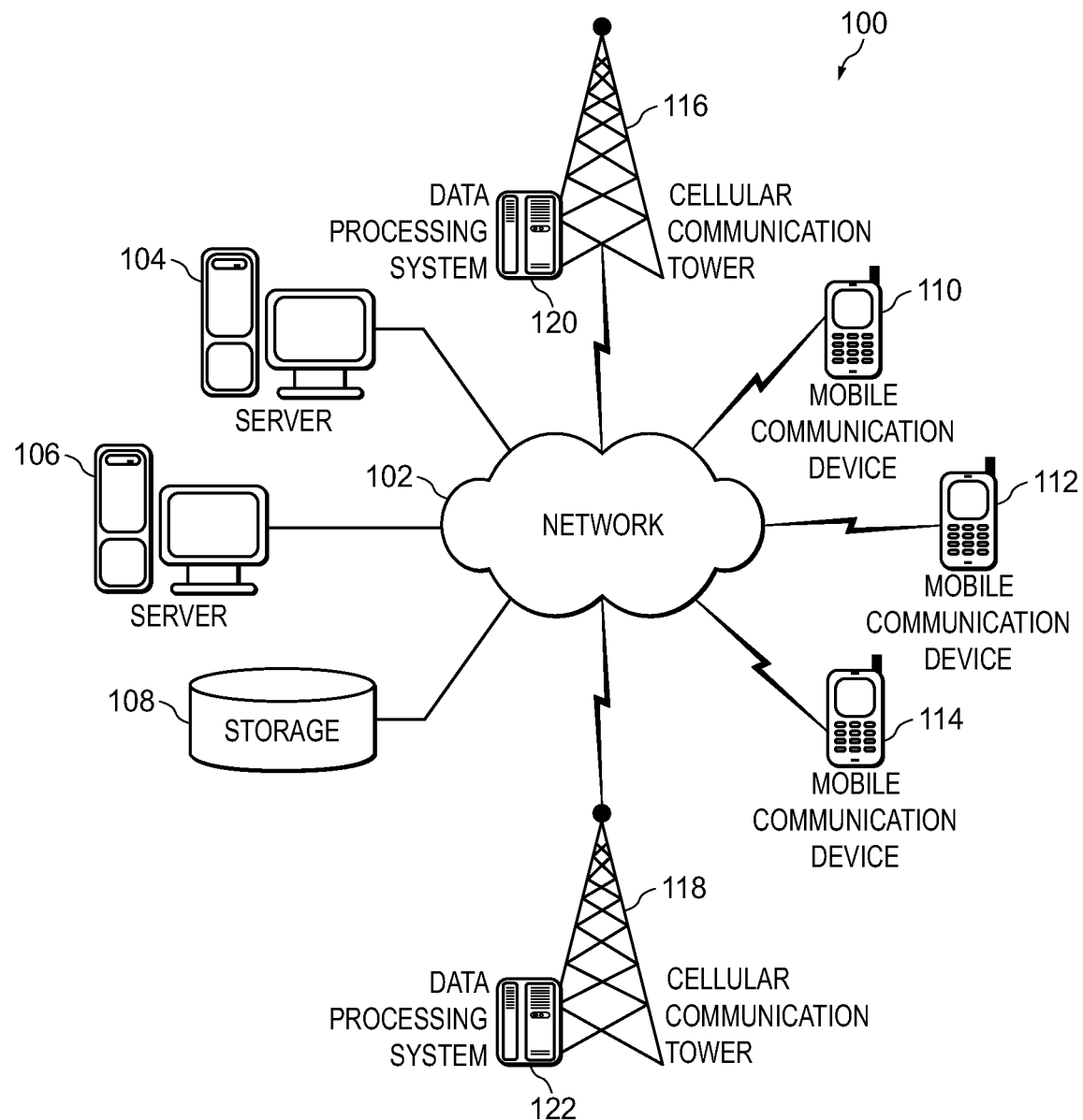
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
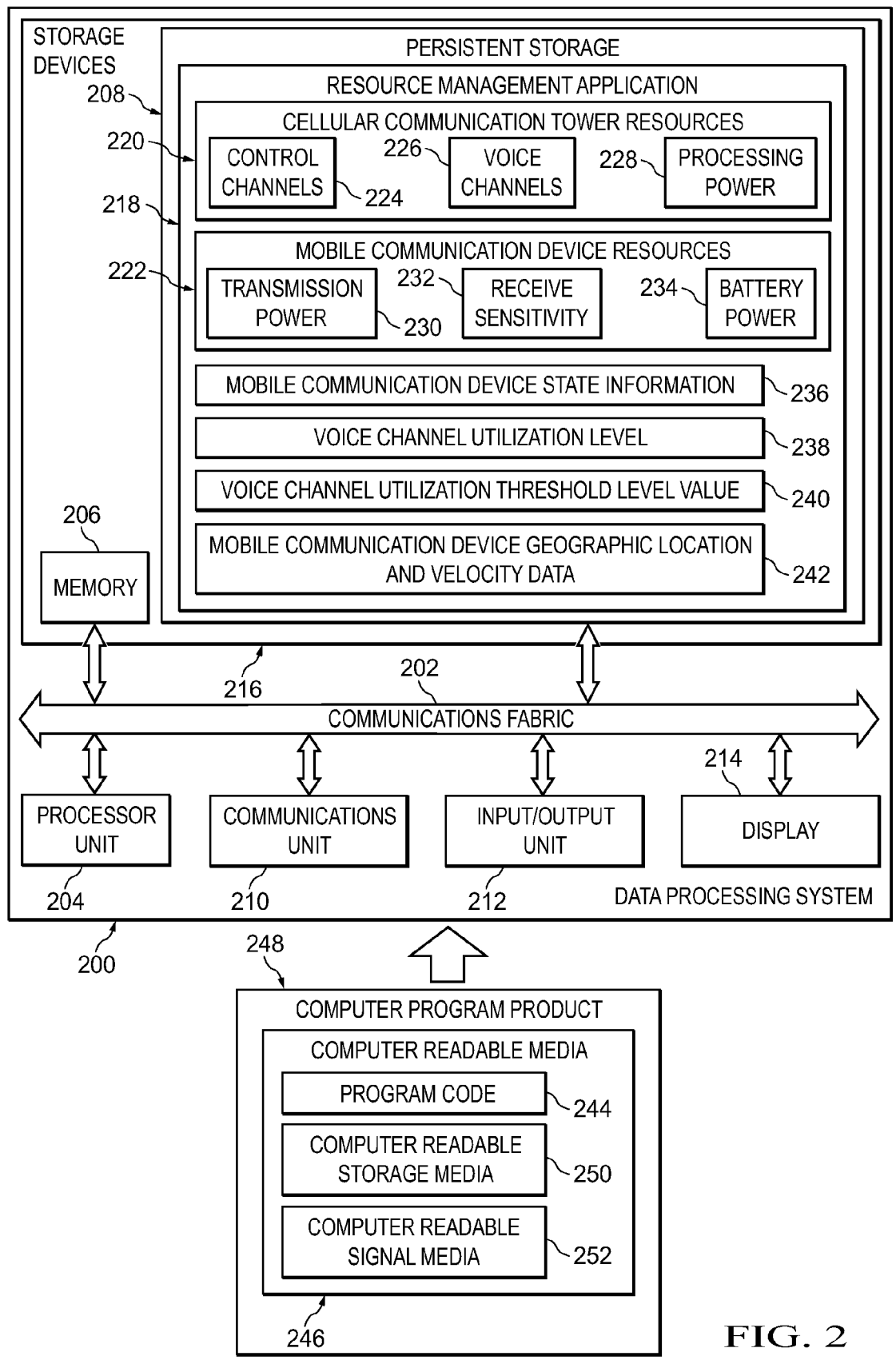
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile communication devices, cellular communication towers, and other data processing devices in which the illustrative embodiments may be implemented. Network data processing system 100 contains network 102, which is the medium used to provide communications links between the computers, mobile communication devices, cellular communication towers, and the other data processing devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more mobile telecommunication system services to the client devices.

Mobile communication device 110, mobile communication device 112, and mobile communication device 114 also connect to network 102. Mobile communication devices 110, 112, and 114 are clients to server 104 and server 106. In the depicted example, server 104 and server 106 may provide information, such as boot files, operating system images, and applications to mobile communication devices 110, 112, and 114. Users of mobile communication devices 110, 112, and 114 may utilize mobile communication devices 110, 112, and 114 to access the mobile telecommunication services provided by server 104 and server 106.

Mobile communication devices 110, 112, and 114 may be, for example, smart phones, cellular telephones, handheld computers, personal digital assistants, or gaming devices with wireless communication links to network 102. It should be noted that mobile communication devices 110, 112, and 114 may represent any combination of different mobile communication devices connected to network 102.

Cellular communication tower 116 and cellular communication tower 118 also connect to network 102. Cellular communication towers 116 and 118 are fixed-location transceivers that communicate directly with mobile communication devices 110, 112, and 114. In this example, cellular communication towers 116 and 118 each serve a different cell within the cellular telecommunication network. Typically, a mobile communication device connects with the nearest available cellular communication tower. A mobile communication device makes and receives calls through the cellular communication tower that the mobile communication device is currently connected to within a cell. A mobile communication device is able to move from cell to cell during an ongoing continuous communication by one cellular communication tower in one cell handing off or handing over the mobile communication device to another cellular communication tower in another cell.

Cellular communication towers 116 and 118 include data processing system 120 and data processing system 122, respectively. Data processing systems 120 and 122 provide the computing and data processing capabilities of cellular communication towers 116 and 118, respectively. For example, data processing systems 120 and 122 may calculate the appropriate radio transmission power level for each of mobile communication devices 110, 112, and 114 based on state information received from each of mobile communication devices 110, 112, and 114. Then, data processing systems 120 and 122 may direct mobile communication devices 110, 112, and 114 to adjust their respective radio transmission power levels based on the calculations.

In addition, data processing systems 120 and 122 may provide the data processing capabilities needed to handoff mobile communication devices 110, 112, and 114 between cellular communication towers 116 and 118. Further, data processing systems 120 and 122 may allocate voice channels to and de-allocate voice channels from mobile communication devices 110, 112, and 114 based on the state information received from mobile communication devices 110, 112, and 114.

Storage 108 is a network storage device capable of storing data in a structured format or unstructured format. Storage 108 may provide storage of a plurality of different user names and associated identification numbers; user profiles; and user account information associated with a cellular telecommunication system network. Further, storage unit 108 may store other data, such as authentication or credential data that may include user names, passwords, and biometric data associated with each of the plurality of users. It should be noted that storage unit 108 may include any data that may be utilized by the cellular telecommunication system network.

Also, it should be noted that network data processing system 100 may include any number of additional server devices, mobile communication devices, cellular communication towers, storage devices, and other devices not shown. Program code located in network data processing system 100 may be stored on a computer readable storage medium and downloaded to a computer or other data processing device for use. For example, program code may be stored on a computer readable storage medium on server 104 and downloaded to mobile communication device 110 over network 102 for use on mobile communication device 110.

In the depicted example, network data processing system 100 may be implemented as a number of different types of telecommunication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or data processing system 120 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource management application 218. However, it should be noted that persistent storage 208 may store any type of application, program, module, and data utilized by the different illustrative embodiments. Resource management application 218 is a software application that manages cellular network resources, such as cellular communication tower resources 220 and mobile communication device resources 222. However, it should be noted that resource management application 218 may manage more or fewer resources than shown in this example.

Cellular communication tower resources 220 are a set of limited resources associated with a cellular communication tower. A limited resource is a resource that only has a predetermined amount or number of that resource available for use. In this example, cellular communication tower resources 220 include control channels 224, voice channels 226, and processing power 228.

A cellular communication tower, such as cellular communication tower 116 in FIG. 1, utilizes control channels 224 to transmit digital control instructions and information to mobile communication devices located within a cell associated with the cellular communication tower. The mobile communication devices may be, for example, mobile communication devices 110 and 112 in FIG. 1. A control instruction directs a mobile communication device to perform a specified action. A control instruction may, for example, direct a mobile communication device to adjust (e.g., decrease) its transmission power level to reduce battery power consumption by the mobile communication device.

The mobile communication devices also may utilize control channels 224 to transmit digital information back to the cellular communication tower. The information sent to the cellular communication tower may include, for example, mobile communication device state information 236 and mobile communication device geographic location and velocity data 242. Mobile communication device state information 236 is information regarding a current state of a particular mobile communication device. The current state of the particular mobile communication device may be, for example, a muted state. A muted state is a state in which no voice or audio signals are being transmitted from the mobile communication device or the level of the voice or audio signals is below a predefined threshold level.

Mobile communication device geographic location and velocity data 242 are data regarding a current geographic location and velocity of a particular mobile communication device. A global positioning system (GPS) transceiver and an accelerometer located within the particular mobile communication device may provide the geographic location and velocity data, for example. However, it should be noted that illustrative embodiments are not limited to using an accelerometer and GPS transceiver to determine geographic location and velocity of a mobile communication device. For example, illustrative embodiments may utilize other location and velocity detection methods, such as cell tower triangulation, to determine geographic location and velocity of a mobile communication device.

The mobile communication devices may utilize voice channels 226 to transmit voice and audio signals to a cellular communication tower. A cellular communication tower may utilize mobile communication device state information 236 from a particular mobile communication device to determine whether to de-allocate a voice channel allocated to that particular mobile communication device. For example, mobile communication device state information 236 may indicate that the particular mobile communication device is in a muted state. As a result, the cellular communication tower currently connected to that particular mobile communication device may de-allocate the voice channel allocated to that particular mobile communication device because no voice or audio signals are currently being transmitted from that particular mobile communication device. In addition, the cellular communication tower may reallocate the de-allocated voice channel to another mobile communication device located within the cell associated with the cellular communication tower. Consequently, the cellular communication tower conserves its limited number of voice channels 226.

A cellular communication tower may utilize processing power 228 to perform calculations and data processing. For example, a cellular communication tower may utilize processing power 228 to calculate a transmission power level of each mobile communication device located within a cell associated with the cellular communication tower. A data processing system associated with the cellular communication tower, such as data processing system 120 associated with cellular communication tower 116 in FIG. 1, may provide processing power 228.

Also, the cellular communication tower may utilize processing power 228 to calculate the geographic position and velocity of each mobile communication device located within the cell associated with the cellular communication tower to determine whether to perform the data processing required to handoff a particular mobile communication device to another cellular communication tower. If, for example, the cellular communication tower determines that a particular mobile communication device is geographically stationary within the cell, then the cellular communication device may decrease processing power 228 to conserve processing power resources because the geographic position and velocity calculations and handoff processing are not needed.

Mobile communication device resources 222 are a set of limited resources associated with a mobile communication device. In this example, mobile communication device resources 222 include transmission power 230, receive sensitivity 232, and battery power 234. Transmission power 230 is a level of power a mobile communication device is currently using to transmit radio signals to a cellular communication tower currently connected to the mobile communication device. Receive sensitivity 232 is a level of sensitivity a mobile communication device has to receive radio signals from a cellular communication tower currently connected to the mobile communication device. Battery power 234 is a level of power or energy a storage battery located within a mobile communication device has available. A cellular communication tower may direct a particular mobile communication device to adjust its transmission power 230 and receive sensitivity 232 based on radio signal strength and state information received from the particular mobile communication device to decrease consumption of battery power 234 within the particular mobile communication device.

Voice channel utilization level 238 is a determined level of utilization of each voice channel in voice channels 224. A cellular communication tower may utilize voice channel utilization level 238 to determine or confirm whether a particular voice channel allocated to a particular mobile communication device is being used to transmit voice or audio signals during a call. The cellular communication tower may utilize voice channel utilization threshold level value 240 to determine or confirm that the particular voice channel allocated to the particular mobile communication device is not being used to transmit voice or audio signals during a call. For example, voice channel utilization threshold level value 240 may be a minimum predefined level of voice or audio signals required to maintain a voice channel allocated to a particular mobile communication device.

Communications unit 210, in this example, provides for communication with mobile communication devices, computing devices, and other data processing systems. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more other devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that battery power of a mobile communication device is a valuable, yet limited, resource. The highest level of battery power consumption in a mobile communication device usually occurs during the time period when a phone call is taking place. Cellular networks proactively adjust the radio power of a mobile communication device, both the radio transmit power and the radio receive sensitivity of the mobile communication device, in response to determining the radio signal strength between the mobile communication device and the cellular radio communication tower the mobile communication device is currently connected to. However, this interaction between mobile communication devices and cellular radio communication towers does not take into account a current activity of a user on a mobile communication device.

Illustrative embodiments utilize the interaction between the mobile communication devices and cellular radio communication towers to conserve cellular network resources by, for example, decreasing battery power consumption in the mobile communication devices, decreasing handoff processing power by cellular radio communication towers, and decreasing a number of voice channels being utilized within cells associated with each of the cellular communication towers. Illustrative embodiments take into consideration metrics, such as distance between a mobile communication device and a cellular radio communication tower, to adjust the radio transmit power of a mobile communication device to conserve battery power or decrease the level of battery power consumption in a mobile communication device. Illustrative embodiments also leverage real-time hardware state information of a mobile communication device, such as, for example, a muted state of a microphone on a mobile communication device, to conserve radio transmission power of a mobile communication device because voice transmission via a voice channel is not needed.

Mobile communication device and cellular radio communication tower interaction continues, even when calls are not taking place on mobile communication devices, which allows the cellular radio communication towers to direct the mobile communication devices to adjust their respective radio transmit power and radio receive sensitivity to optimize radio signal traffic between the cellular radio communication towers and all the mobile communication devices located within a cell associated with each particular cellular radio communication tower. A cellular radio communication tower also uses this interaction to handoff a moving mobile communication device to another cellular radio communication tower as the mobile communication device moves to another cell associated with the other cellular radio communication tower. This interaction exchange between cellular radio communication towers and mobile communication devices typically happens every few seconds when mobile communication devices are idle.

Illustrative embodiments enhance the interaction protocol between cellular radio communication towers and mobile communication devices to include state information of each of the mobile communication devices to be sent to the cellular radio communication towers so that the towers' software can utilize this state information to conserve cellular network resources during particular user activities on the mobile communication devices. For example, a mobile communication device may include in the interaction protocol, which is sent between the mobile communication device and the particular cellular radio communication tower the mobile communication device is currently connected to, the current state of a "mute" button while a call is in progress on the mobile communication device. If a call is in progress and the mobile communication device currently is in a muted state, illustrative embodiments reduce the mobile communication device's radio transmit power level to a minimum level needed to maintain a radio signal connection and does not maintain a radio transmit power level necessary for voice quality transmission. Thus, by reducing the radio transmit power of a mobile communication device illustrative embodiments decrease the level of battery power consumption on the mobile communication device.

When the user deactivates the muted state of the mobile communication device and the mobile communication device returns to a voice state, the next interaction protocol exchange can signal the change to the voice state to the cellular radio communication tower. After receiving the change in state information, the cellular radio communication tower recalculates and determines the radio transmit power level needed for the mobile communication device based on the change in state. In cases where users utilize their mobile communication devices to engage in conference calls, or other situations where the users spend long periods of time in a "listen-only mode", illustrative embodiments can make a significant improvement in battery power consumption by the mobile communication devices.

Further, knowing the state information of a mobile communication device may not only save radio transmit power resources at the mobile communication device side of the interaction, but may also save valuable resources at the cellular radio communication tower side of the interaction. For example, during a one hour conference call, a mobile communication device utilizing illustrative embodiments may inform the cellular radio communication tower over a control channel that the voice channel allocated to the mobile communication device can be de-allocated during the conference call. For example, during the duration of that one hour conference call, the cellular radio communication tower may reallocate the use of that de-allocated voice channel, which is a limited cellular network resource, for multiple other short calls by other mobile communication devices within the same cell associated with that particular cellular radio communication tower.

Furthermore, in order to manage a multitude of mobile communication devices within a particular cell, illustrative embodiments have the mobile communication devices include in the interaction protocol geographic location and velocity data so that the cellular radio communication tower associated with the cell can determine when mobile communication devices are geographically stationary within the cell. The mobile communication devices may utilize a GPS transceiver located within a mobile communication device to provide its geographic location and velocity data to a connected cellular radio communication tower. The mobile communication devices also may utilize an accelerometer located within a mobile communication device to provide velocity data. In addition, illustrative embodiments may utilize cell tower triangulation data to determine the geographic location and velocity of mobile communication devices. Of course, illustrative embodiments may utilize any method for detecting the geographic location and velocity of mobile communication devices. By knowing that a mobile communication device is stationary within its cell, the cellular radio communication tower can determine that the stationary mobile communication device will not need to be handed off to another cellular radio communication tower. As a result, the cellular radio communication tower may conserve its handoff processing power resources. Thus, illustrative embodiments of the present invention provide a method, data processing system, and computer program product for managing cellular network resources within a cell associated with a cellular communication tower.

Figure 3A:
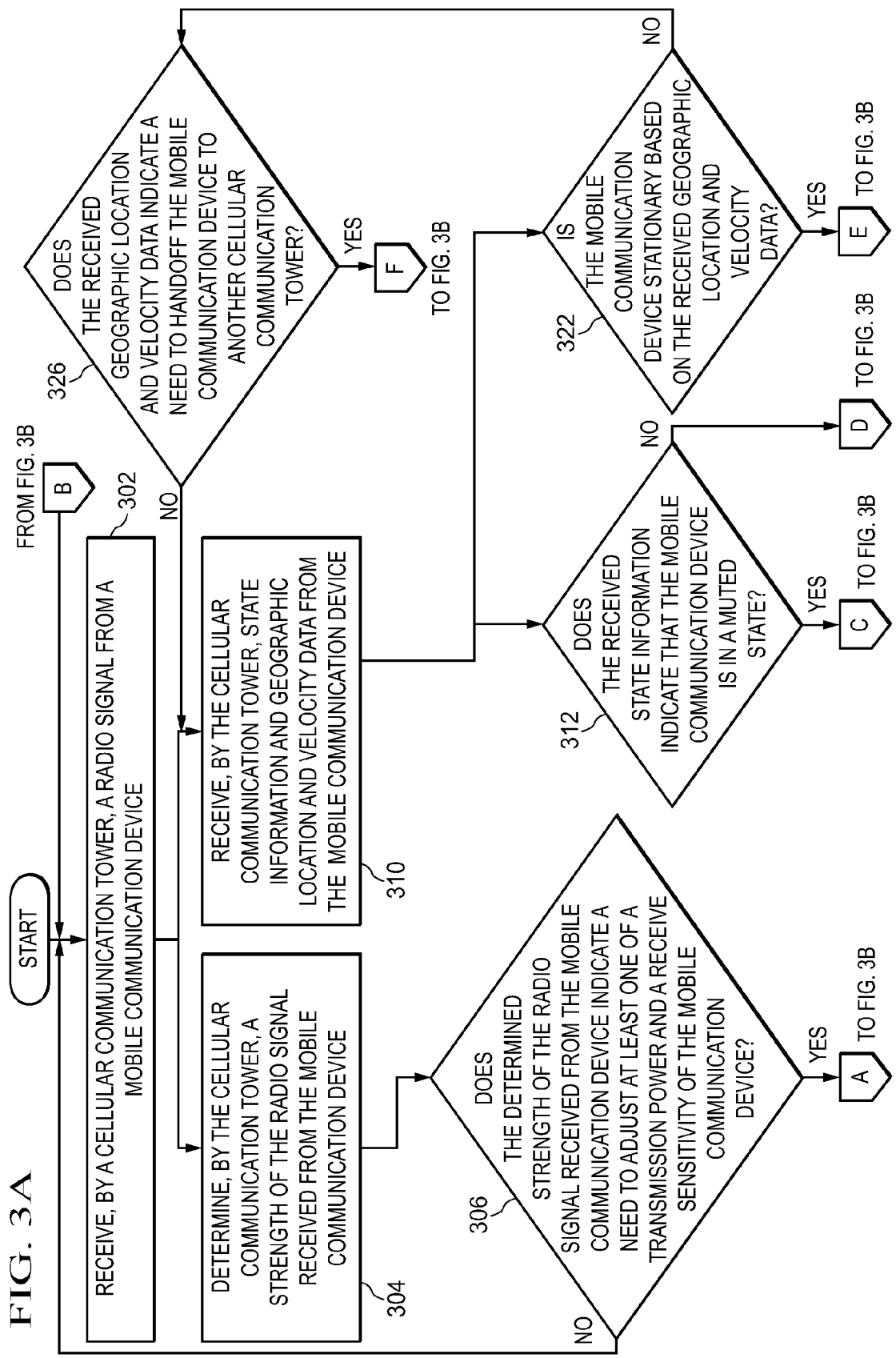

With reference now to FIGS. 3A-3B, a flowchart illustrating a process for managing cellular network resources within a cell associated with a cellular communication tower is shown in accordance with an illustrative embodiment. The process shown in FIGS. 3A-3B may be implemented in a cellular communication tower, such as, for example, cellular communication tower 116 in FIG. 1.

The process begins when the cellular communication tower receives a radio signal from a mobile communication device, such as mobile communication device 110 in FIG. 1 (step 302). After receiving the radio signal in step 302, the cellular communication tower determines a strength of the radio signal received from the mobile communication device (step 304). Subsequently, the cellular communication tower makes a determination as to whether the determined strength of the radio signal received from the mobile communication device indicates a need to adjust at least one of a transmission power and a receive sensitivity of the mobile communication device (step 306). The transmission power and receive sensitivity of the mobile communication device may be, for example, transmission power 230 and receive sensitivity 232 in FIG. 2.

If the cellular communication tower determines that the strength of the radio signal received from the mobile communication device does not indicate a need to adjust at least one of a transmission power and a receive sensitivity of the mobile communication device, no output of step 306, then the process returns to step 302 where the cellular communication tower continues to receive and monitor radio signals received from the mobile communication device. If the cellular communication tower determines that the strength of the radio signal received from the mobile communication device does indicate a need to adjust at least one of a transmission power and a receive sensitivity of the mobile communication device, yes output of step 306, then the cellular communication tower sends a control signal to the mobile communication device directing the mobile communication device to adjust at least one of the transmission power and the receive sensitivity of the mobile communication device based on the determined strength of the radio signal (step 308). Afterward, the process returns to step 302.

In addition, the cellular communication tower receives state information and geographic location and velocity data from the mobile communication device (step 310). The state information and geographic location and velocity data from the mobile communication device may be, for example, mobile communication device state information 236 and mobile communication device geographic location and velocity data 242 in FIG. 2. After receiving the state information and geographic location and velocity data in step 310, the cellular communication tower makes a determination as to whether the received state information indicates that the mobile communication device is in a muted state (step 312).

If the cellular communication tower determines that the received state information does indicate that the mobile communication device is in a muted state, yes output of step 312, then the cellular communication tower sends a control signal to the mobile communication device directing the mobile communication device to decrease the transmission power of the mobile communication device based on the muted state to conserve battery power of the mobile communication device (step 314). The battery power of the mobile communication device may be, for example, battery power 234 in FIG. 2. In addition, the cellular communication tower de-allocates a voice channel used by the mobile communication device based on the muted state (step 316).

Further, the cellular communication tower allocates the de-allocated voice channel used by the mobile communication device to another mobile communication device, such as mobile communication device 112 in FIG. 1, to conserve voice channel resources of the cellular communication tower (step 318). The voice channel resources of the cellular communication tower may be, for example, voice channels 226 of cellular communication tower resources 220 in FIG. 2. Thereafter, the process returns to step 302.

If the cellular communication tower determines that the received state information does not indicate that the mobile communication device is in a muted state, no output of step 312, then the cellular communication tower maintains the voice channel used by the mobile communication device (step 320). Thereafter, the process returns to step 302.

Also, after receiving the state information and geographic location and velocity data in step 310, the cellular communication tower makes a determination as to whether the mobile communication device is stationary based on the received geographic location and velocity data (step 322). If the cellular communication tower determines that the mobile communication device is stationary based on the received geographic location and velocity data, yes output of step 322, then the cellular communication tower decreases handoff processing power resources of the cellular communication tower to conserve processing power of the cellular communication tower (step 324). The processing power of the cellular communication tower may be, for example, processing power 228 of cellular communication tower resources 220 in FIG. 2. Thereafter, the process returns to step 302.

If the cellular communication tower determines that the mobile communication device is not stationary based on the received geographic location and velocity data, no output of step 322, then the cellular communication tower makes a determination as to whether the received geographic location and velocity data indicates a need to handoff the mobile communication device to another cellular communication tower (step 326). If the cellular communication tower determines that the received geographic location and velocity data does not indicate a need to handoff the mobile communication device to another cellular communication tower, no output of step 326, then the process returns to step 310 where the cellular communication tower continues to receive state information and geographic location and velocity information from the mobile communication device. If the cellular communication tower determines that the received geographic location and velocity data does indicate a need to handoff the mobile communication device to another cellular communication tower, yes output of step 326, then the cellular communication tower handoffs the mobile communication device to another cellular communication tower (step 328). Thereafter, the process terminates.

Figure 4:
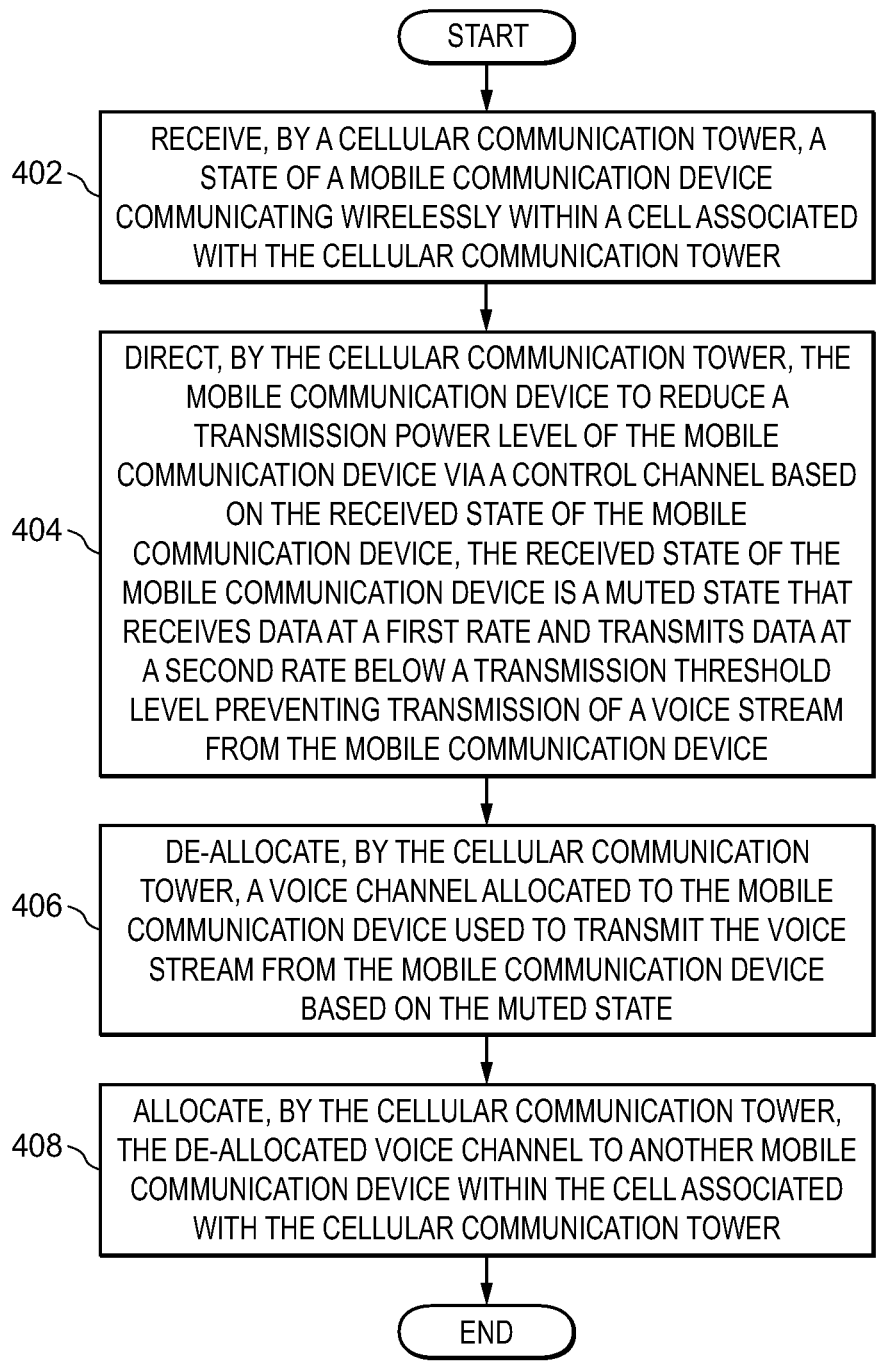
FIG. 4 is a flowchart illustrating a process for directing a mobile communication device to reduce a radio transmission power level of the mobile communication device to conserve battery power in the mobile communication device in accordance with an illustrative embodiment.

With reference now to FIG. 4, a flowchart illustrating a process for directing a mobile communication device to reduce a radio transmission power level of the mobile communication device to conserve battery power in the mobile communication device is shown in accordance with an illustrative embodiment. The process shown in FIG. 4 may be implemented in a cellular communication tower, such as, for example, cellular communication tower 116 in FIG. 1.

The process begins when the cellular communication tower receives a state of a mobile communication device communicating wirelessly within a cell associated with the cellular communication tower (step 402). The mobile communication device may be, for example, mobile communication device 110 in FIG. 1. The received state of the mobile communication device may be, for example, mobile communication device state information 236 in FIG. 2.

After receiving the state of the mobile communication device in step 402, the cellular communication tower directs the mobile communication device to reduce a transmission power level of the mobile communication device via a control channel based on the received state of the mobile communication device (step 404). The control channel may be, for example, one of the control channels in control channels 224 in FIG. 2. The received state of the mobile communication device is a muted state that receives data at a first rate and transmits data at a second rate below a transmission threshold level preventing transmission of a voice stream from the mobile communication device. The transmission threshold level may be, for example, voice channel utilization threshold level value 240 in FIG. 2.

Further, the cellular communication tower de-allocates a voice channel allocated to the mobile communication device used to transmit the voice stream from the mobile communication device based on the muted state (step 406). The voice channel may be, for example, one of the voice channels in voice channels 226 in FIG. 2. In addition, the cellular communication tower allocates the de-allocated voice channel to another mobile communication device within the cell associated with the cellular communication tower (step 408). Thereafter, the process terminates.

Thus, illustrative embodiments provide a method, data processing system, and computer program product for managing cellular network resources within a cell associated with a cellular communication tower. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for decreasing battery power consumption in a mobile communication device by reducing transmission power, the method comprising:

receiving, by a cellular communication tower, state information from the mobile communication device communicating wirelessly regarding a muted state of the mobile communication device, wherein the muted state receives information at a first rate and sends information at a second rate below a threshold preventing transmission of a voice stream from the mobile communication device;

responsive to the cellular communication tower detecting the muted state of the mobile communication device communicating wirelessly using the received state information, directing, by the cellular communication tower, the mobile communication device to reduce the transmission power of the mobile communication device to decrease the battery power consumption in the mobile communication device, de-allocating, by the cellular communication tower, a voice channel allocated to the mobile communication device to conserve voice channel resources of the cellular communication tower, and reallocating, by the cellular communication tower, the de-allocated voice channel to another mobile communication device within a cell associated with the cellular communication tower.

2. The method of claim 1, further comprising:

responsive to the cellular communication tower determining that the mobile communication device is stationary based on geographic location and velocity data received from the mobile communication device, decreasing, by the cellular communication tower, handoff processing power resources of the cellular communication tower to conserve processing power of the cellular communication tower.

3. The method of claim 2, wherein a global positioning system transceiver and an accelerometer located within the mobile communication device provide the geographic location and velocity data of the mobile communication device.

4. The method of claim 1, wherein the mobile communication device is one of a smart phone, a cellular telephone, a handheld computer, a personal digital assistant, or a gaming device with a wireless communication link to a cellular network.

5. A cellular communication tower for decreasing battery power consumption in a mobile communication device by reducing transmission power, the cellular communication tower comprising:

a bus system;

a storage device connected to the bus system, wherein the storage device stores computer readable program code; and a processor unit connected to the bus system, wherein the processor unit executes the computer readable program code to receive state information from the mobile communication device communicating wirelessly regarding a muted state of the mobile communication device, wherein the muted state receives information at a first rate and sends information at a second rate below a threshold preventing transmission of a voice stream from the mobile communication device; direct the mobile communication device communicating wirelessly to reduce the transmission power of the mobile communication device to decrease the battery power consumption in the mobile communication device, de-allocate a voice channel allocated to the mobile communication device to conserve voice channel resources of the cellular communication tower, and reallocate the de-allocated voice channel to another mobile communication device within a cell associated with the cellular communication tower in response to detecting the muted state of the mobile communication device communicating wirelessly using the received state information.

6. The cellular communication tower of claim 5, wherein the processor unit further executes the computer readable program code to decrease handoff processing power resources of the cellular communication tower to conserve processing power of the cellular communication tower in response to determining that the mobile communication device is stationary based on geographic location and velocity data received from the mobile communication device.

7. The cellular communication tower of claim 6, wherein a global positioning system transceiver and an accelerometer located within the mobile communication device provide the geographic location and velocity data of the mobile communication device.

8. A computer program product comprising a computer readable storage medium having computer readable program code encoded thereon that is executable by a data processing system of a cellular communication tower for decreasing battery power consumption in a mobile communication device by reducing transmission power, the computer program product comprising:

computer readable program code to receive state information from the mobile communication device communicating wirelessly regarding a muted state of the mobile communication device, wherein the muted state receives information at a first rate and sends information at a second rate below a threshold preventing transmission of a voice stream from the mobile communication device;

computer readable program code to direct the mobile communication device communicating wirelessly to reduce the transmission power of the mobile communication device to decrease the battery power consumption in the mobile communication device, de-allocate a voice channel allocated to the mobile communication device to conserve voice channel resources of the cellular communication tower, and reallocate the de-allocated voice channel to another mobile communication device within a cell associated with the cellular communication tower in response to detecting the muted state of the mobile communication device communicating wirelessly using the received state information.

9. The computer program product of claim 8, further comprising:

computer readable program code to decrease handoff processing power resources of the cellular communication tower to conserve processing power of the cellular communication tower in response to determining that the mobile communication device is stationary based on geographic location and velocity data received from the mobile communication device.

10. The computer program product of claim 9, wherein a global positioning system transceiver and an accelerometer located within the mobile communication device provide the geographic location and velocity data of the mobile communication device.

11. The computer program product of claim 8, wherein the mobile communication device is one of a smart phone, a cellular telephone, a handheld computer, a personal digital assistant, or a gaming device with a wireless communication link to a cellular network.

\* \* \* \* \*